(12) United States Patent
Moradi et al.

(10) Patent No.: US 11,240,177 B2
(45) Date of Patent: Feb. 1, 2022

(54) NETWORKS AND HIERARCHICAL ROUTING FABRICS WITH HETEROGENEOUS MEMORY STRUCTURES FOR SCALABLE EVENT-DRIVEN COMPUTING SYSTEMS

(71) Applicant: UNIVERSITAT ZURICH, Zurich (CH)

(72) Inventors: Saber Moradi, New Haven, CT (US); Giacomo Indiveri, Zurich (CH); Ning Qiao, Glattpark (CH); Fabio Stefanini, New York, NY (US)

( * ) Notice: Subject to any disclaimer, the term of this patent is extended or adjusted under 35 U.S.C. 154(b) by 684 days.

(21) Appl. No.: 15/569,773

(22) PCT Filed: Apr. 27, 2016

(86) PCT No.: PCT/EP2016/059446
§ 371 (c)(1),
(2) Date: Oct. 27, 2017

(87) PCT Pub. No.: WO2016/174113
PCT Pub. Date: Nov. 3, 2016

(65) Prior Publication Data
US 2018/0139153 A1 May 17, 2018

(30) Foreign Application Priority Data
Apr. 27, 2015 (EP) .................... 15165272

(51) Int. Cl.
*H04L 12/947* (2013.01)
*G06N 3/04* (2006.01)
(Continued)

(52) U.S. Cl.
CPC ............. *H04L 49/25* (2013.01); *G06N 3/049* (2013.01); *G06N 3/063* (2013.01); *H04L 45/04* (2013.01)

(58) Field of Classification Search
CPC ......... H04L 49/25; H04L 45/04; G06N 3/049; G06N 3/063
(Continued)

(56) References Cited

U.S. PATENT DOCUMENTS 5,751,913 A * 5/1998 Chiueh ................. G06N 3/082
706/41
2005/0281116 A1* 12/2005 Furber ..................... G11C 8/06
365/230.01

(Continued)

FOREIGN PATENT DOCUMENTS

| JP | 05233586 | 2/1992 |
|---|---|---|
| JP | 2013546065 A | 8/2011 |
| JP | 2014048707 A | 8/2012 |

*Primary Examiner* — Chi Tang P Cheng
(74) *Attorney, Agent, or Firm* — JMB Davis Ben-David

(57) ABSTRACT

Among other aspects, the present invention relates to a network comprising a plurality of interconnected core circuits (10) particularly arranged on several units (6), wherein each core circuit (10) comprises: an electronic array (8, 9) comprising a plurality of computing nodes (90) and a plurality of memory circuits (80) which is configured to receive incoming events, wherein each computing node (90) is configured to generate an event comprising a data packet when incoming events received by the respective computing node (90) satisfy a pre-defined criterion, and a circuit which is configured to append destination address and additional source information, particularly source core ID, to the respective data packet, and a local first router (R1) for providing intra-core connectivity and/or delivering events to intermediate level second router (R2) for inter-core connectivity and to higher level third router (R3) for inter-unit connectivity, and a broadcast driver (7) for broadcasting incoming events to all the memory circuits (80) in the core circuit (10) in parallel.

20 Claims, 14 Drawing Sheets

(51) Int. Cl.
*G06N 3/063* (2006.01)
*H04L 12/715* (2013.01)

(58) Field of Classification Search
USPC .......................................... 370/389
See application file for complete search history.

(56) References Cited

U.S. PATENT DOCUMENTS

| | | |
|---|---|---|
| 2006/0184466 A1 | 8/2006 | Nugent |
| 2008/0120260 A1* | 5/2008 | Yancey ................ G06N 3/063 706/33 |
| 2014/0032465 A1* | 1/2014 | Modha .................... G06N 3/04 706/27 |

* cited by examiner get events

Broadcast

NETWORKS AND HIERARCHICAL ROUTING FABRICS WITH HETEROGENEOUS MEMORY STRUCTURES FOR SCALABLE EVENT-DRIVEN COMPUTING SYSTEMS

CROSS-REFERENCE TO RELATED APPLICATIONS

This is the U.S. National Stage of International Patent Application No. PCT/EP2016/059446 filed Apr. 27, 2016, which was published in English under PCT Article 21(2), and which in turn claims the benefit of European Patent Application No. 15165272.4 filed Apr. 27, 2015.

The invention relates to networks, particularly neural networks, routing fabrics and corresponding methods.

The problem underlying the present invention is to provide improved networks, particularly neural networks, and corresponding methods.

This problem is solved by a network according to claim 1. According thereto, a network is provided that comprises a plurality of interconnected core circuits (e.g. arranged on several chips or units or tiles), wherein each core circuit comprises:

an electronic array comprising a plurality of computing nodes and a plurality of memory circuits, which electronic array is configured to receive incoming events (and particularly using local memory to discriminate input events or incoming events), wherein each computing node is configured to generate an event comprising a data packet if incoming events received by the respective computing node satisfy a pre-defined criterion, and a circuit which is configured to append a destination address and additional source information (e.g. a source core ID, particularly virtual source core ID, see e.g. below) to the respective data packet, and a local first router (R1) for providing rapid intra-core connectivity and/or delivering events to intermediate level second router (R2) for inter-core and higher level third router (R3) for inter-chip (or inter-unit or inter-tile) connectivity, and a broadcast driver for broadcasting incoming events to all the memory circuits in the core in parallel.

In the following, core-circuits are also denoted as cores.

Furthermore, particularly, the respective computing node may receive said incoming events via memory circuits of the respective electronic array.

Particularly, an event-based routing fabric that combines hierarchical routing structures with heterogeneous memory architectures is provided. This routing fabric can be applied to architectures that comprise asynchronous computing nodes distributed across multiple computing cores. The fabric consists of a combination of source- and destination-based routing where data packets are processed at different levels of the hierarchy before being routed. This allows the construction of heterogeneous network structures enabling memory and bandwidth optimization. We demonstrate the invention with the realization of a stack of routing fabrics that use three different strategies: broadcast, tree and mesh routing. The memory used to store the connectivity among computing nodes uses different structures distributed within nodes, cores and routers. Computing nodes operate in parallel, independently and asynchronously, by processing asynchronous input and producing an asynchronous event when conditions on the input data are met. In the case of spiking neural networks, computing nodes are artificial neurons that receive input events (e.g. incoming events) from multiple sources and produce one output spike when the sum of the input events crosses a set threshold. We demonstrate the invention within the context of a scalable spiking neural network with programmable connectivity implemented on a full-custom micro-chip.

Further, particularly, the present invention relates to asynchronous event-based systems and circuits for information processing and computing, particularly event-based networks, and particularly spiking neural networks. Event-based systems are electronic computing systems in which elements carry out computation and communication via asynchronous events, produced by their computing nodes when given sets of conditions on their input signals are met. The invention relates to a hierarchical routing fabric with distributed and heterogeneous memory structures that optimizes memory usage for programming the network connectivity. As the network connectivity determines its computational properties, the invention can be used to construct hardware implementations of "deep networks", including deep belief and convolutional networks, recurrent neural networks, including reservoir computing networks, as well as probabilistic graphical models, including factor graphs. The network connectivity is realized by programming routing Look Up Tables (LUTs) distributed on the network and Content-Addressable Memories (CAMs) associated to computing nodes. The types of networks that can be programmed into the system depend on the amount of memory allocated in the elements, cores and routers.

A particular instance of such systems is a spiking neural network. The computing elements are modeled on the dynamics or biological neurons and as such they generate events, often referred to as spikes, in response to the integrated input spikes exceeding a set threshold. This spike-event is encoded as a packet and delivered to its destination by a physical network comprising router units and synaptic units. The connectivity of the neural network is realized through the appropriate routing of spike events from the sources to their destinations using local and distributed memory structures. This architecture is referred to as event-driven and implements the artificial neural network.

Furthermore, particularly, embodiments of the invention provide asynchronous event-driven architectures for parallel computing systems. The degree of connectivity among the system computational nodes and the types of computations that can be programmed into the system depend on the amount of memory allocated to the individual nodes, cores, and routers.

Particularly, the present invention is described by means of an embodiment in which the computational nodes are integrate-and-fire neurons with dynamic synapses without limiting the scope of the present invention. According to this embodiment, a neural network comprises a plurality of interconnected nodes within and across multiple cores, distributed on one or more electronic chips. Each core comprises a multitude of blocks with neural and synaptic elements storing the connectivity of the network and realizing the neural computation. The synaptic elements of a neuron in the core have memory structures that store the identity of the pre-synaptic neurons they accept inputs from. When the right pre-synaptic neuron stimulates a valid synaptic element, this element generates an analog current which is integrated by the post-synaptic neuron the synapse is connected to. When the integrated input currents sent by all synapses connected to a neuron exceed a threshold, the neuron activates a spike-generation mechanism. When a neuron produces an output spike, this is encoded by its source address and this address is routed as an asynchronous data packet to other nodes following a hierarchical scheme. At the lowest level, a core router distributes spikes whose source and destinations are located in the same core. At intermediate levels one or more sets of tree routers distribute spikes that are either generated by or target cores within the same chip. Tree routers are organized in a hierarchical level and multiple routers can span multiple levels of the hierarchy.

At the highest level, a mesh router distributes spikes across multiple chips distributed in a 2-dimensional mesh.

According to an embodiment of the network according to the invention, the network further comprises an event routing system interconnecting the core circuits, wherein the event routing system comprises said local first routers, and particularly also further routers, particularly second and third routers, wherein particularly the entirety of the routers form a hierarchical structure.

Further, according to an embodiment of the network according to the invention, each router (R1, R2, R3) comprises at least one control circuit that is configured to route events (or signals) according to the route payload, particularly comprised by the respective event/data packet, and wherein each first router (R1) further comprises:
- a programmable memory (e.g. an array of digital local memories) configured to store route payload and particularly virtual source core ID for said data packets,
- at least one circuit configured to append route payload and particularly virtual source core ID to the respective data packet, depending on programmed route assignments stored in said memory.

The virtual source core ID is an additional code appended to the source address independently on each neuron to increase the total address space, particularly to increase events discriminability and thus to reduce addresses ambiguity, on a per neuron basis instead of a per core basis.

Further, according to an embodiment of the network according to the invention, the core circuits are arranged in units, particularly in the form of modular tiles or chips, wherein particularly each unit comprises several of the core circuits, and wherein each unit comprises one of the first routers, wherein particularly said first routers are each disposed in a hierarchical structure formed by the entirety of the routers.

Further, according to an embodiment of the network according to the invention, said hierarchical structure comprises a lowest level comprising the first routers, wherein particularly the first routers are configured to distribute events whose source and destinations are located in the same core circuit.

Further, according to an embodiment of the network according to the invention, said hierarchical structure comprises at least one intermediate level comprising the second routers, wherein particularly the second routers are configured to distribute events generated by or target core-circuits within the same unit.

Further, according to an embodiment of the network according to the invention, said hierarchical structure comprises a highest level comprising the third (e.g. mesh) routers that are configured to distribute events between different units, wherein particularly the third routers are arranged in a two-dimensional mesh.

Further, according to an embodiment of the network according to the invention, the routers are disposed in a hierarchical structure formed by the routers, wherein different asynchronous routing schemes co-exist at different levels of the hierarchical structure by mapping source addresses and said data packets generated by the computing nodes in the core circuits for matching the different routing schemes at the different levels.

Further, according to an embodiment of the network according to the invention, the network is a synthetic neuronal network, wherein each computing node forms a neuron, and wherein each of said memory circuits forms a synapse, wherein particularly the computing nodes are designed to integrate (e.g. sum up) incoming events and to generate an event when the signal formed by the integrated events crosses a firing threshold.

According to claim 10, the present invention further relates to the aspect of an (e.g. massively) parallel network of (e.g. highly) interacting multi-core processors, each comprising a plurality of core circuits which are configured to communicate events in the form of data packets within a core circuit and/or between different core circuits, wherein the network is configured to regulate said communication by a hierarchy of asynchronous routers that are configured to act on independent communication paths.

Further, according to an embodiment of the parallel network according to the invention, each data packet consist of: an encoded source address of a computing node of a core circuit generating that address, additional digital codes specifying a part or all the respective event's route along the network.

According to claim 12, the present invention further relates to the aspect of a method for distributing routing memory across a network (particularly in a way to minimize packet payload), wherein different routing strategies are used that co-exist within the same network.

According to claim 13, the present invention further relates to the aspect of a method for routing events in a network, particularly using a network according to one of the claims 1 to 9, wherein the method comprises
- providing a network comprising a plurality of interconnected core circuits, wherein each core circuit comprises an electronic array comprising a plurality of computing nodes and a plurality of memory circuits,
- generating an event comprising a data packet by means of a computing node if incoming events received by the respective computing node satisfy a pre-defined criterion,
- distributing the generated event within its core circuit by means of a local first router comprised by each core circuit, wherein a destination address and particularly additional virtual source core ID are appended by the respective first router to the respective data packet depending on a programmed route assignment stored in said memory,
- broadcasting incoming events to all the memory circuits in the respective core-circuit in parallel by the respective first router,
- distributing events generated by core-circuits or targeting core-circuits within the same unit by the respective intermediate level second router according to the destination address appended to the respective data packet, and
- distributing events between different units by means of the respective higher level third router according to the destination address appended to the respective data packet.

According to claim 14, the present invention further relates to the aspect of a routing fabric for routing events in a network that comprises a plurality of interconnected core circuits, each core circuit comprising an electronic array comprising a plurality of computing nodes and a plurality of memory circuits (e.g. using local memory to discriminate input events or incoming events) which array is configured to receive incoming events, wherein each computing node is configured to generate an event comprising a data packet if incoming events received by the respective computing node satisfy a pre-defined criterion, the routing fabric comprising:

a plurality of local first routers (R1) for providing rapid intra-core circuit connectivity, wherein a local first router (R1) is configured to be assigned to each core circuit, wherein the respective first router (R1) is configured to distribute data packets of events whose source and destinations are located in the same core circuit to which the respective first router is assigned, a plurality of broadcast drivers, wherein each broadcast driver is configured to be assigned to one of the core circuits and to delivering incoming events to all the memory circuits in its associated core-circuit in parallel, a plurality of second routers (R2) configured to provide inter-core connectivity, wherein particularly the second routers are configured to distribute events according to the route payload comprised by the respective data packet, and a plurality of third routers (R3) configured to provide inter-chip (or inter-unit or inter-tile) connectivity, wherein particularly the third routers are configured to distribute events according to the route payload comprised by the respective data packet.

The above-described features and other features, aspects and advantages of the present invention will become understood with reference to the following description, appended claims and accompanying figures.

Embodiments of the invention provide VLSI implementable event-driven neural architecture with distributed memory and heterogeneous memory structures for scalable neural networks. The hierarchical routers architecture provides a power and time efficient strategy for interconnecting nodes within and among multiple cores distributed on multicore chips. Distributed memory in cores and events broadcasting in each core provide large fan-out to implement large neural networks with typical structural constraints of biologically plausible models. Fully asynchronous routers and programming fabric allow fast operations of synaptic computation for impending off-line learning.

The term neuron and synapse as used herein represent circuits to simulate biological neurons and synapses. The electronic neuron sums up contributions of relative synapses to produce spike events. A neuromorphic system comprising electronic neurons and synapses according to embodiments of the invention may include various processing elements that are modeled on biological neurons. Certain illustrative embodiments of the invention are described herein using analog neurons and CAM modules for storing synaptic connectivity. The present invention is not limited to neuron and synapse computing elements. The event-driven computing system according to embodiments of the invention can use arbitrary asynchronous computing nodes that process multiple input events to produce a single output event. Furthermore, the present invention supports any type of massively parallel mixed-signal event-based computation that requires large fan-out for information sharing.

According to embodiments of the invention, fully asynchronous circuit implementations are used for routers but the present invention is not limited to such implementations.

Figure 1:
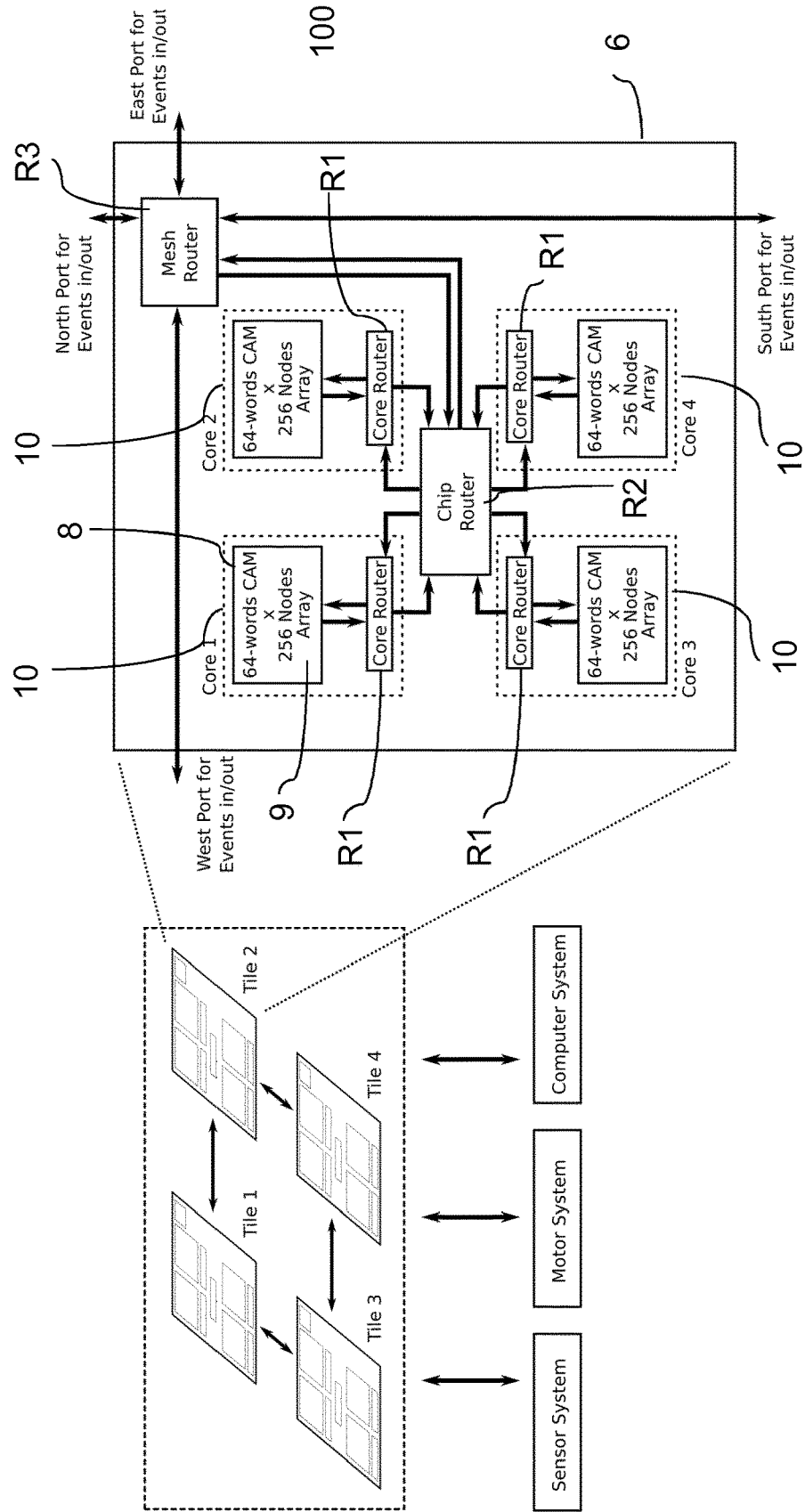
FIG. 1 shows an overview diagram illustrating the structure of an example multi-core network, in accordance to an embodiment of the invention.

According to an embodiment of the invention (cf. e.g. FIG. 1), a neural network comprises a plurality of multi-core chips 6. Each chip 6 comprises a multitude of cores 10 with neural and synaptic elements storing the connectivity of the network and thus realizing a particular form of neural computation.

Each core 10 comprises an array 9 of neurons, a synapse array 8 (which arrays 8, 9 may form part of an electronic array 8, 9), with multiple synapses 80 (or memory circuits 80) per neuron 90 (or per computing node 90), an SRAM memory 2 for storing a destination LUT 3, and a core (or first) router R1. Furthermore, each chip 6 also comprises a chip (or second) router R2, and a mesh (or third) router, R3. Each neuron 90 integrates multiple events received and accepted by the corresponding synapses 80, and generates spike-events when the integrated signal crosses a firing threshold. The spike produced by a neuron 90 is encoded as a digital address event, representing the source's identity, by the core's encoder and is transmitted to R1. According to the destination information stored in its local LUT 3, R1 decides whether to process and deliver the event further to R2 or back to the Core. Additionally, R1 can generate fanout from that event, i.e., up to 4 events can be generated and assigned different destinations as programmed in the LUT SRAM 2. When an R2 router receives a spike event from any of the core routers R1, it checks the destination addresses and decides whether to deliver the events back to the corresponding core routers or further to R3 accordingly. Each synapse 80 has an n-bit CAM word to store the address of the source neuron 90 it is connected to, the synapse type, and its synaptic efficacy. Once one event is sent to the specific core 10, the address is broadcasted to all the synapses 80 within the core 10. The synapses 90 whose stored address matches the broadcasted address generate a PSC with the given parameters of synapse type and synaptic efficacy to the corresponding post-synaptic neuron 90. Note that fanout is generated (1) when an event leaves one core 10 and reaches R1, depending on how R1 memory is programmed for that event, and (2) when an event reaches the core 10 from R1. The scheme described supports highly interconnected networks requiring information sharing at short and long distances.

Figure 2:
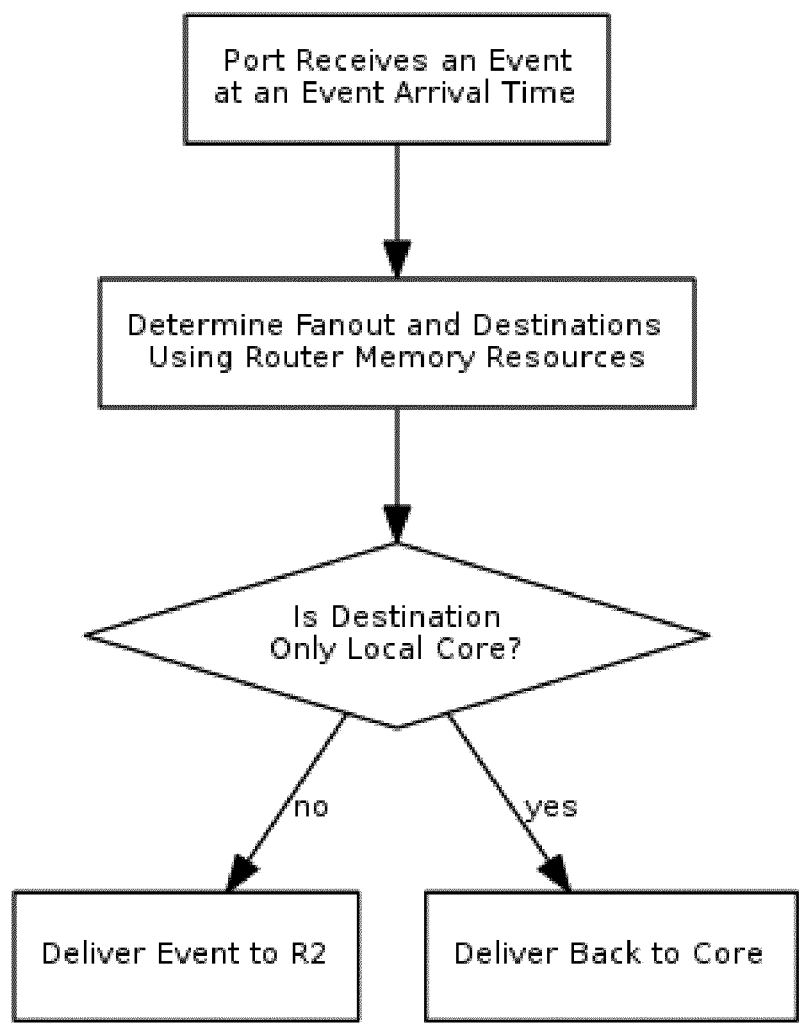
FIG. 2 shows a diagram of the processes instantiated on the core router R1 by an event generated within the corresponding core, in accordance to an embodiment of the invention.

FIG. 2 shows further process details of the R1 router according to an embodiment of the invention. When a neuron 90 generates a spike, the address of this spike is sent to R1. The destination for this event is stored in a LUT 3 that R1 can access. According to the programmed destination for the event, R1 can send the event back to the core 10 or append to the event packet a digital code representing the destination for this event. In the given example, a spike from the core 10 is represented as 8-bit address event. The appended destination address consists of a 12-bits code, including 6-bits for chip shifting (dx, dy), 2-bits for virtual source core ID and 4-bits for within-chip destinations. The virtual source core ID is an additional code appended to the source address independently on each neuron to increase the total address space, to increase events discriminability and thus to reduce addresses ambiguity, on a per neuron basis instead of a per core basis. For example, neuron 243 of core 1 can be assigned virtual ID=1, neuron 121 of_same_core can be assigned a different virtual ID, for example 2. One spike event can also generate fanout as programmed in the SRAM memory 2, each event being assigned a different destination but carrying the same source address.

Figure 3:
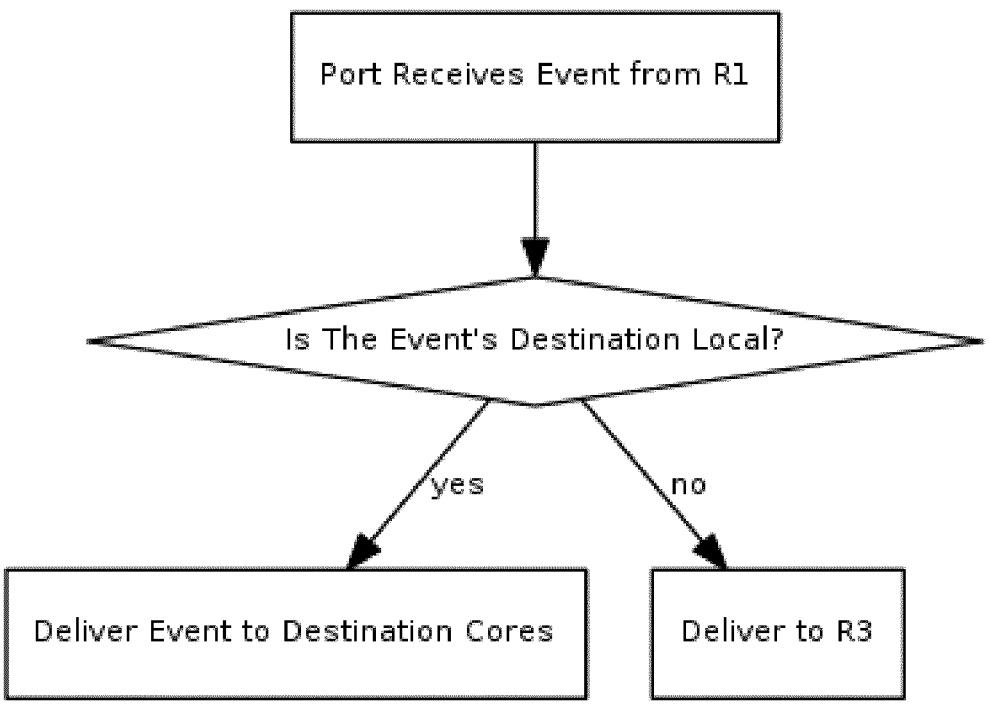
FIG. 3 shows a diagram of the processes instantiated on the chip router R2 by an event generated within one of the chip cores, in accordance to an embodiment of the invention.
Figure 4:
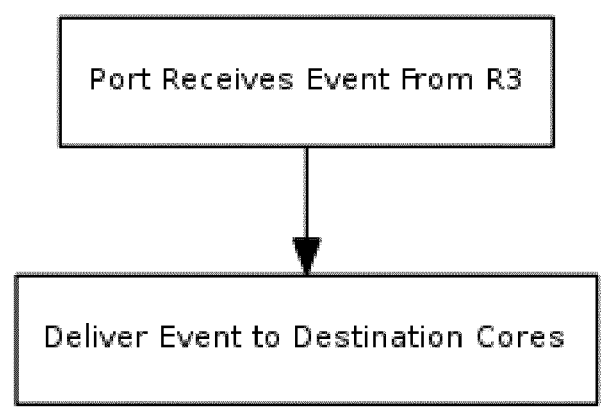
FIG. 4 shows a diagram of the processes instantiated on the chip router R2 by an event generated by a neuron within any of the interconnected chips, in accordance to an embodiment of the invention.

When R2 receives an event from R1, it checks whether the target cores 10 for this event are located within the same chip 6, as shown in FIG. 3. If this is the case, R2 will deliver the event according to the destination core 10 read from the event packet. Otherwise, this event will be delivered to R3. R2 also receives events from different chips 6 via R3 as is shown in FIG. 4. When this happens, it will send the event down to the branches according to the destination code appended to the source address.

Figure 5:
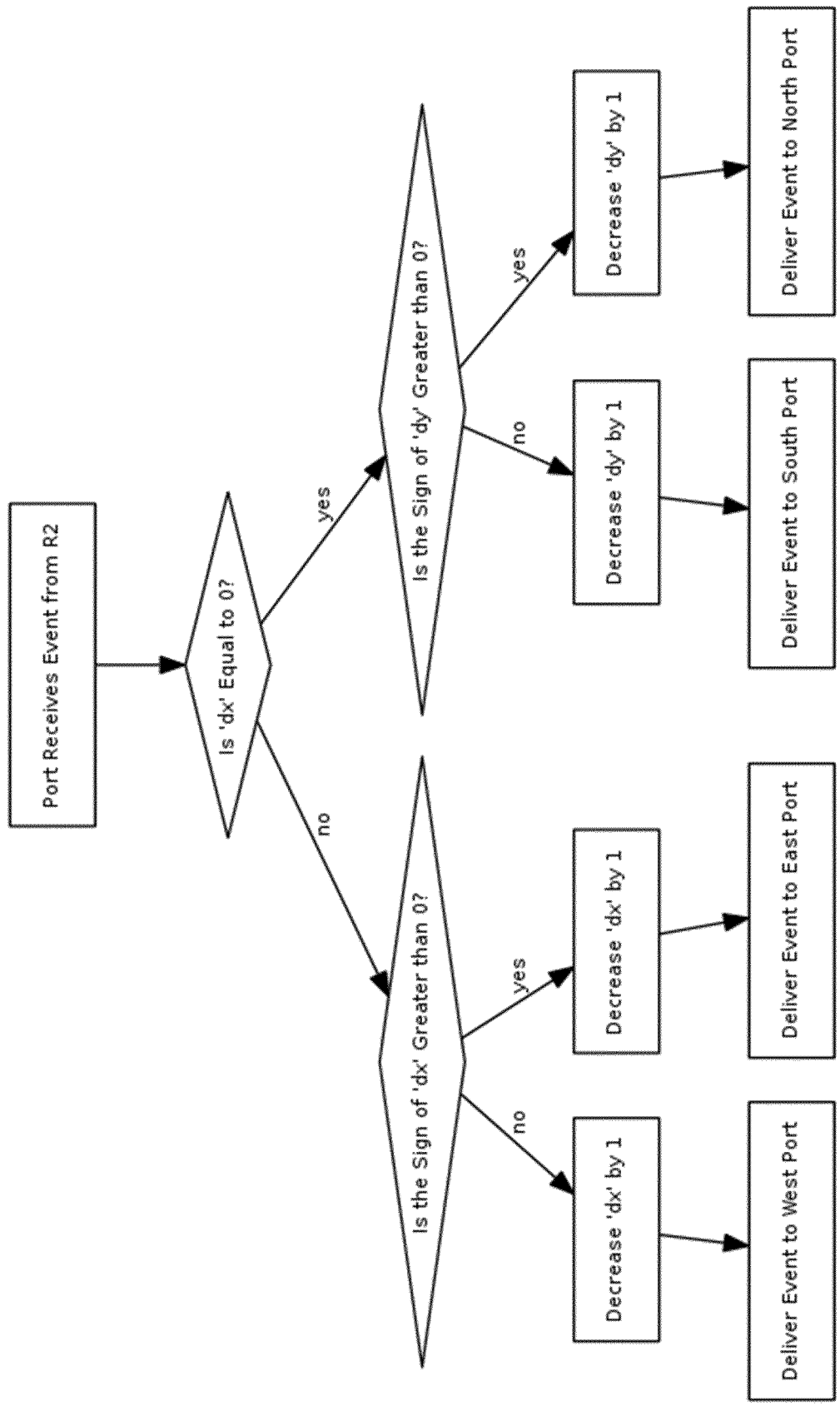
FIG. 5 shows a diagram of the processes instantiated on the mesh router R3 by an event generated by a neuron within the corresponding chip, in accordance to an embodiment of the invention.
Figure 6:
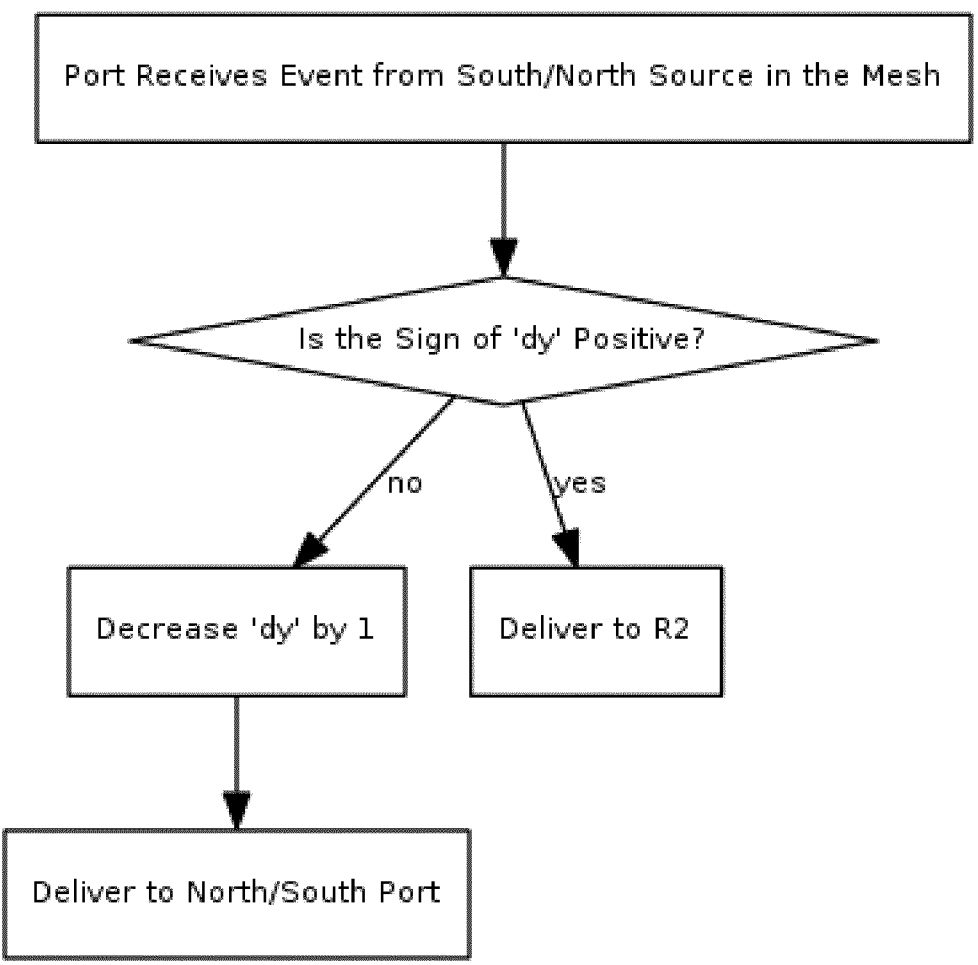
FIG. 6 shows a diagram of the processes instantiated on the mesh router R3 by an event generated by a neuron within any of the interconnected chips arriving at North or South port of R3, in accordance to an embodiment of the invention.
Figure 7:
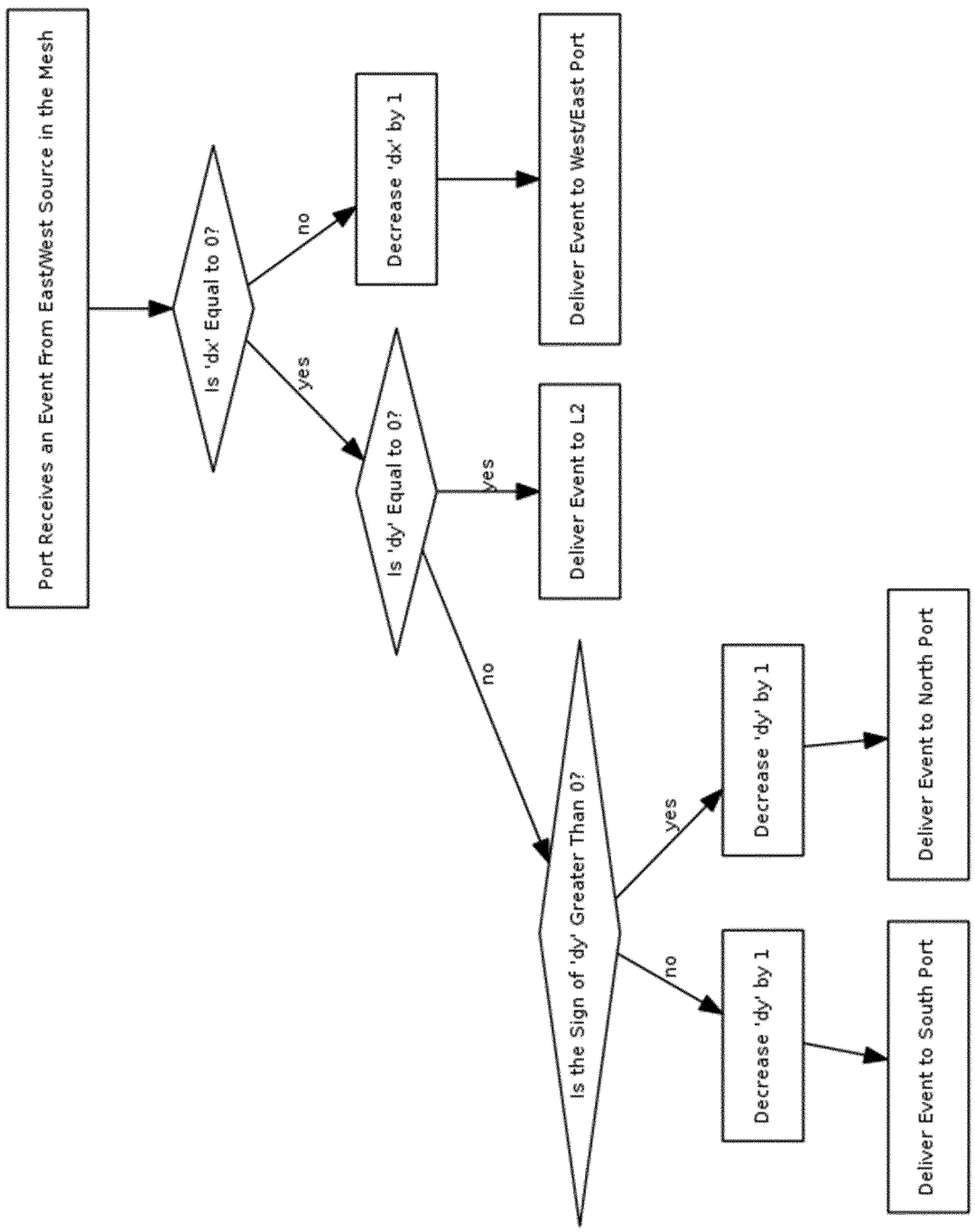
FIG. 7 shows a diagram of the processes instantiated on the mesh router R3 by an event generated by a neuron within any of the interconnected chips arriving at East or West port of R3, in accordance to an embodiment of the invention.
Figure 8:
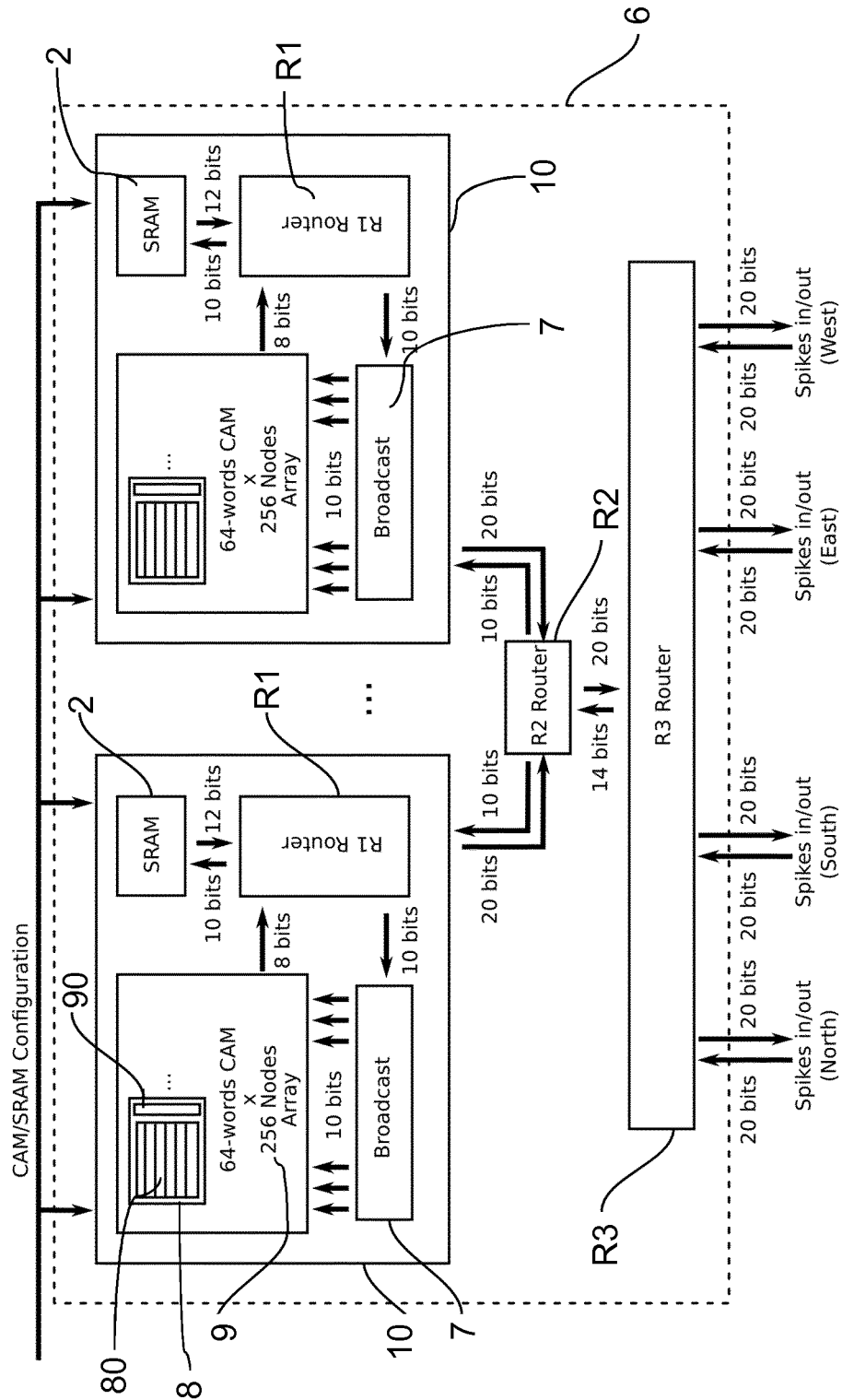
FIG. 8 shows a diagram illustrating the architecture of one neural network, in accordance to an embodiment of the invention.

FIG. 5 shows the details of the R3 router processing when it receives an event from R2, according to an embodiment of the invention. In this example, R3 will first check the x-direction (East-West) shift number. If x shift is not 0, R3 will check the sign of dx to decide the direction of delivery, East for dx>0 and West for dx<0. Then, dx is decreased by 1 and the event is delivered to the proper direction. If x shift is 0, R3 will check the sign of dy to decide the direction for delivery, North for dy>0 and South for dy<0. Then, dy is decreased by 1 and the event is delivered to the proper direction. Thus, a priority rule is set in this example such that once an event is delivered to R3, it will first be shifted along the East-West direction and then along the North-South direction. The event will travel along the mesh until both dx and dy are 0. As it is shown in FIG. 6, once R3 receives an event from South/North (y-direction) one can assume that the event does not need to be further shifted along the x-direction, as the above priority rule holds. Hence, once dy's value is 0, the event is delivered to R2 in the corresponding chip.

Figure 9:
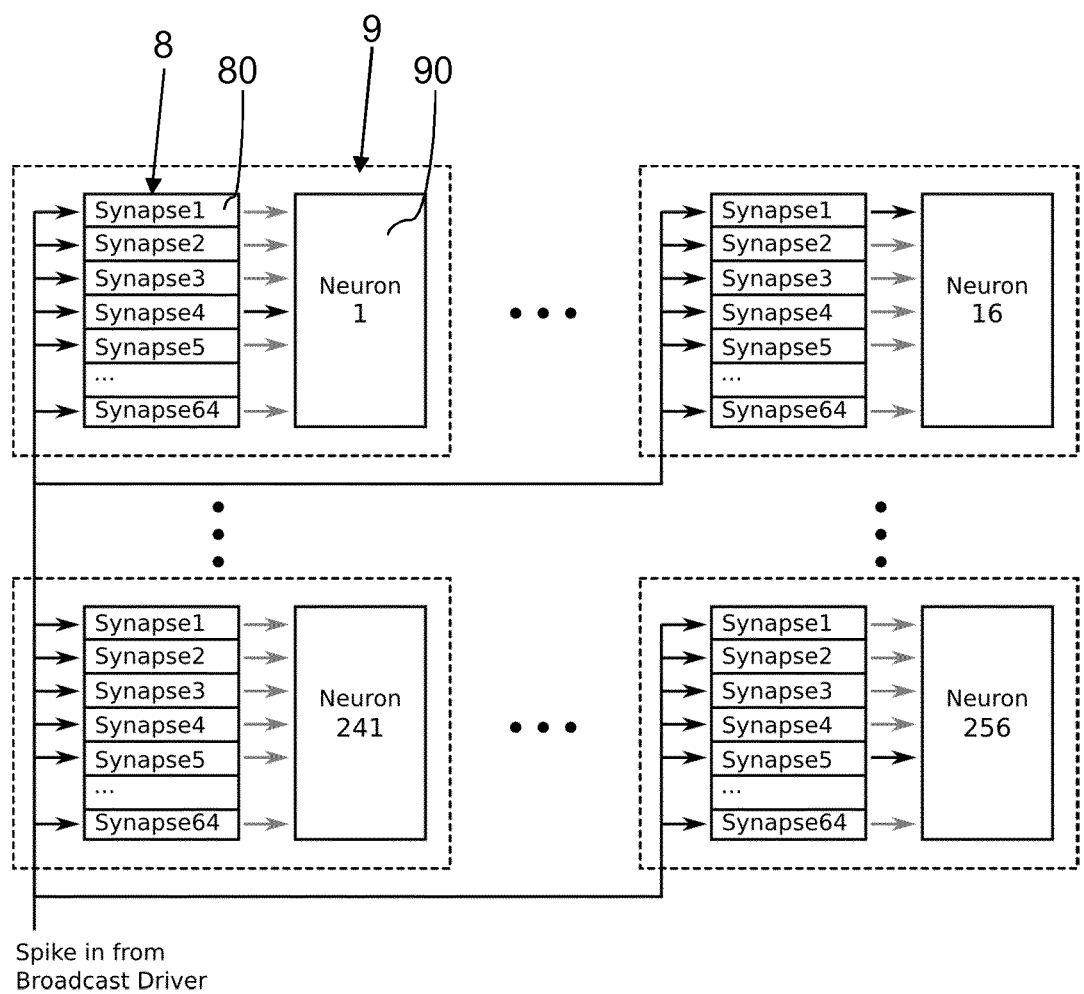
FIG. 9 shows a diagram illustrating a multitude of neuron pixels and the flow of signals broadcasted to them from outside the core, in accordance to an embodiment of the invention.

CAM words are used as synapses 80 for storing neuron connections and synaptic efficacies. In an example, one core 10 has 256 neurons with 64 CAM-based synapses per neuron. Each CAM word is composed of 12 bits: 10 bits for source address and 2 bits for synaptic type. Spike events arriving at one core are broadcasted to the whole core by the Broadcast Driver. Each CAM compares the event on the broadcast bus with the stored content. The ones for which the content matches the broadcasted event will raise a "match state" and generate the appropriate Post-Synaptic Current (PSC). In FIG. 9 the synapse 4 of neuron 1, synapse 1 of neuron 16 and synapse 5 of neuron 5 store an address which matches with the one delivered by the broadcast driver and so they raise a response generating appropriate currents onto the corresponding neurons.

Figure 10:
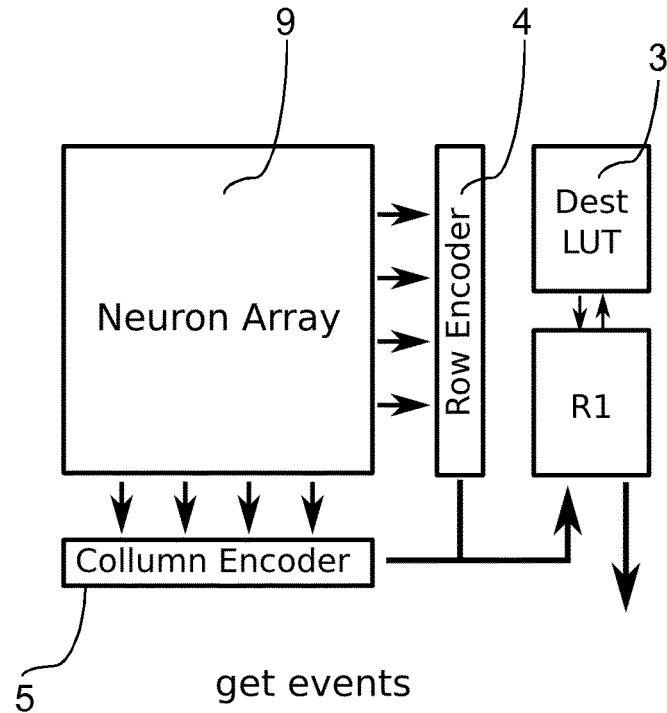
FIG. 10 shows the block diagram of one core and the flow of signals when spikes are generated within that core, in accordance to an embodiment of the invention.

FIG. 10 shows the process of emitting an event for spikes generated within the neuron array 9. Spikes generated by neurons 90 will be encoded as the neuron addresses. For example, for a 16×16 neuron array, spikes can be encoded as 8 bits with 4 bits for column and 4 bits for row by a Column Encoder 5 and Row Encoder 4. This event will be sent to core router R1 first to get destination addresses and additional source core ID by reading the destination SRAM LUT as explained above.

Figure 11:
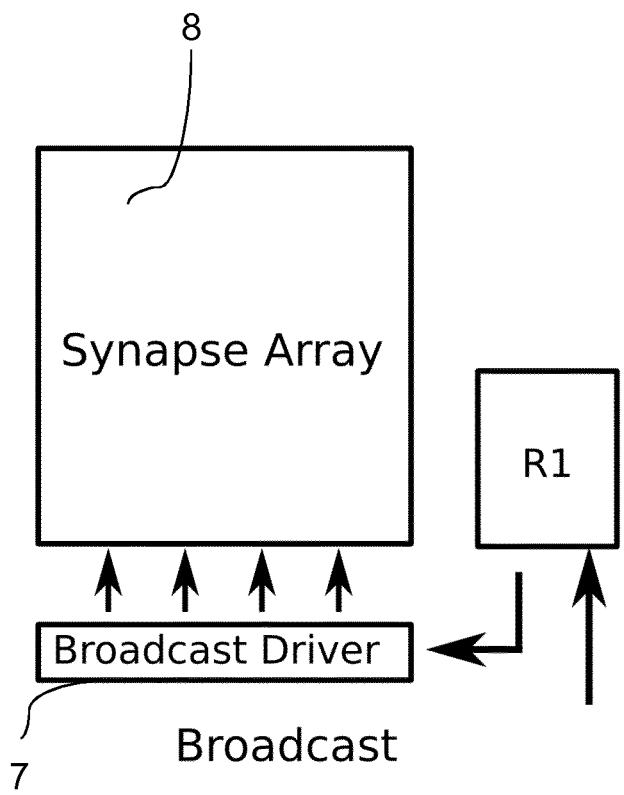
FIG. 11 shows the block diagram of one core and the flow of signals when spikes are received by that core, in accordance to an embodiment of the invention.

FIG. 11 shows the process of broadcasting one event once an event is sent to a particular core 10. The received event is received by R1 first and then broadcasted to the synapse array 8 by broadcast driver 7. The broadcast driver 7 will deliver the spikes to all the CAMs in the core 10, which will then discriminate the source address of the event and generate a PSC accordingly.

Figure 12:
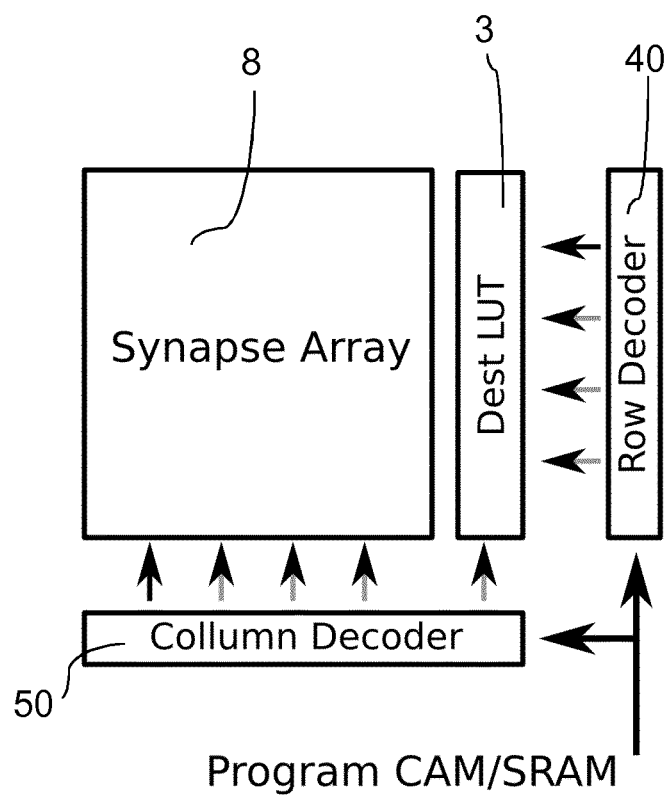
FIG. 12 shows the block diagram of one core and the flow of signals used to program the core memory and to configure the neurons, in accordance to an embodiment of the invention.

FIG. 12 shows an example of programming memory 3 of a core by sending address and data to Row Decoder 40 and Column Decoder 50. As CAM-based heterogeneous memory structure and distributed Destination SRAM LUT 3 are used in each core 10, the contents of CAM/SRAM can be easily programmed by Row Decoder 40 and Column Decoder 50 using standard writing operations for CAM/SRAM.

Figure 13:
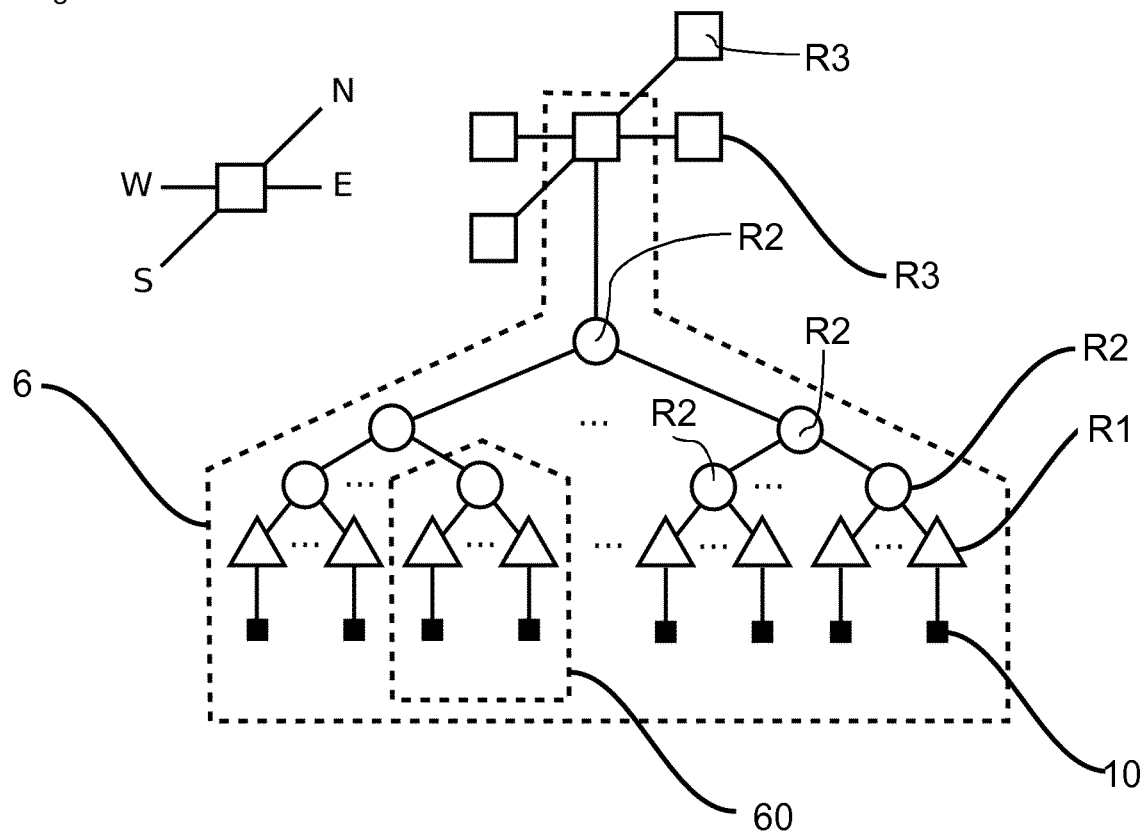
FIG. 13 shows a mesh of hierarchical structures with three levels of hierarchy size and branching (trees), in accordance to an embodiment of the invention.

FIG. 13 shows another example of a hierarchical network or routing fabric with heterogeneous memory structures. The routing fabric combines a 2-dimensional mesh of tree structures 6, the leaves of which are the multi-neuron cores 10. According to an embodiment of the invention, each core 10 has one core (or first) router R1 for spike in/out (e.g. intra-core connectivity). Events delivered from one core 10 to the other core 10 in the same branch 60 will first be sent to a low-level branch router (or second router) R2 and then sent to one or more target cores 10 according to the destination code carried by the address event. Events delivered from one core 10 to one or more other cores 10 in different branches but within the same chip 6 will be sent to higher (second) routers R2 first then to lower branch routers R2 as encoded in the destination code carried by the event. The depth of the tree and the number of different cores within the same chip that can be targeted depend on the number of bits carried by the address event as destination code. In one example, each chip 6 has one tile router (or third router) R3 to interconnect such tree structures in a 2-dimensional mesh.

Figure 14:
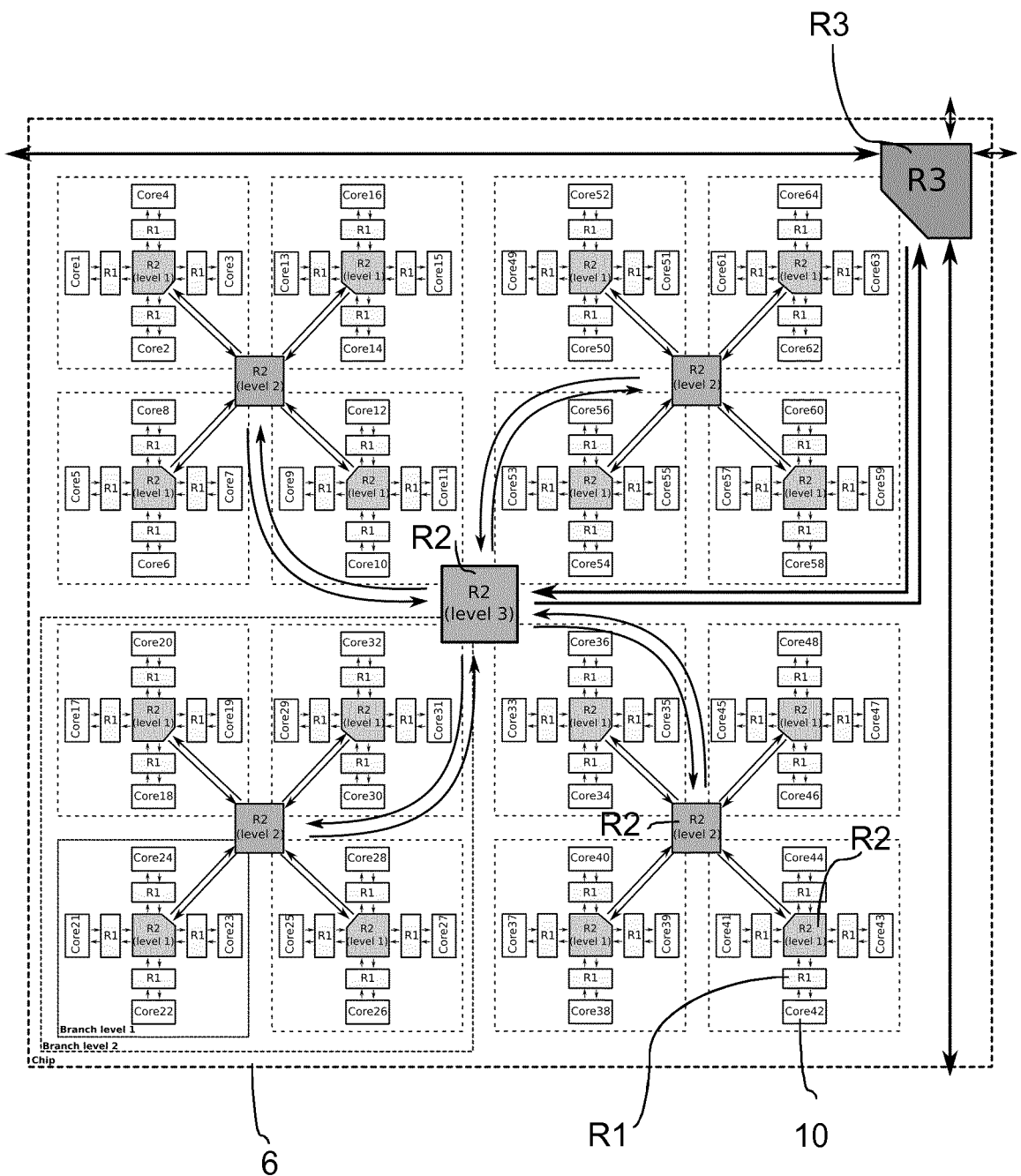
FIG. 14 shows the block diagram of an example of chip with 64 cores organized in a hierarchical structure and the communication flow, in accordance to an embodiment of the invention.

FIG. 14 shows an example of a chip structure consisting of 64 cores 10 using the hierarchical routing scheme described in FIG. 13. In this example, each core 10 has a dedicated (first) router R1 for local core connections. A group of 4 cores is defined as the lowest level branching of the tree structure. Groups of four of these modules are defined as level-two branch, thus each including 16 cores 10. The example chip 6 consists of a group of four of these modules (third level in the tree), thus consisting of a total of 64 cores 10. Each level includes a dedicated (second) router R2 for cores communications within this level and for sending/receiving events to/from other levels in the tree 6.

According to the destination addresses assigned to each event generated within the cores 10, events targeting destinations within the same core 10 are routed by the core router R1, thus implementing local connectivity. Events targeting other cores 10 within the same level-one branch will be sent to (second) router R2 and then processed and delivered to corresponding cores 10. In general, router memories are programmed such that events climb the tree through R2 routers at different levels as much as needed to reach any destination cores 10 within the chip 6. If the target of an event resides on a core 10 of a different chip 6, the event is sent through all the layers up to the chip (or third) router R3, which will further process and deliver it along the appropriate directions in the mesh.

Figure 15:
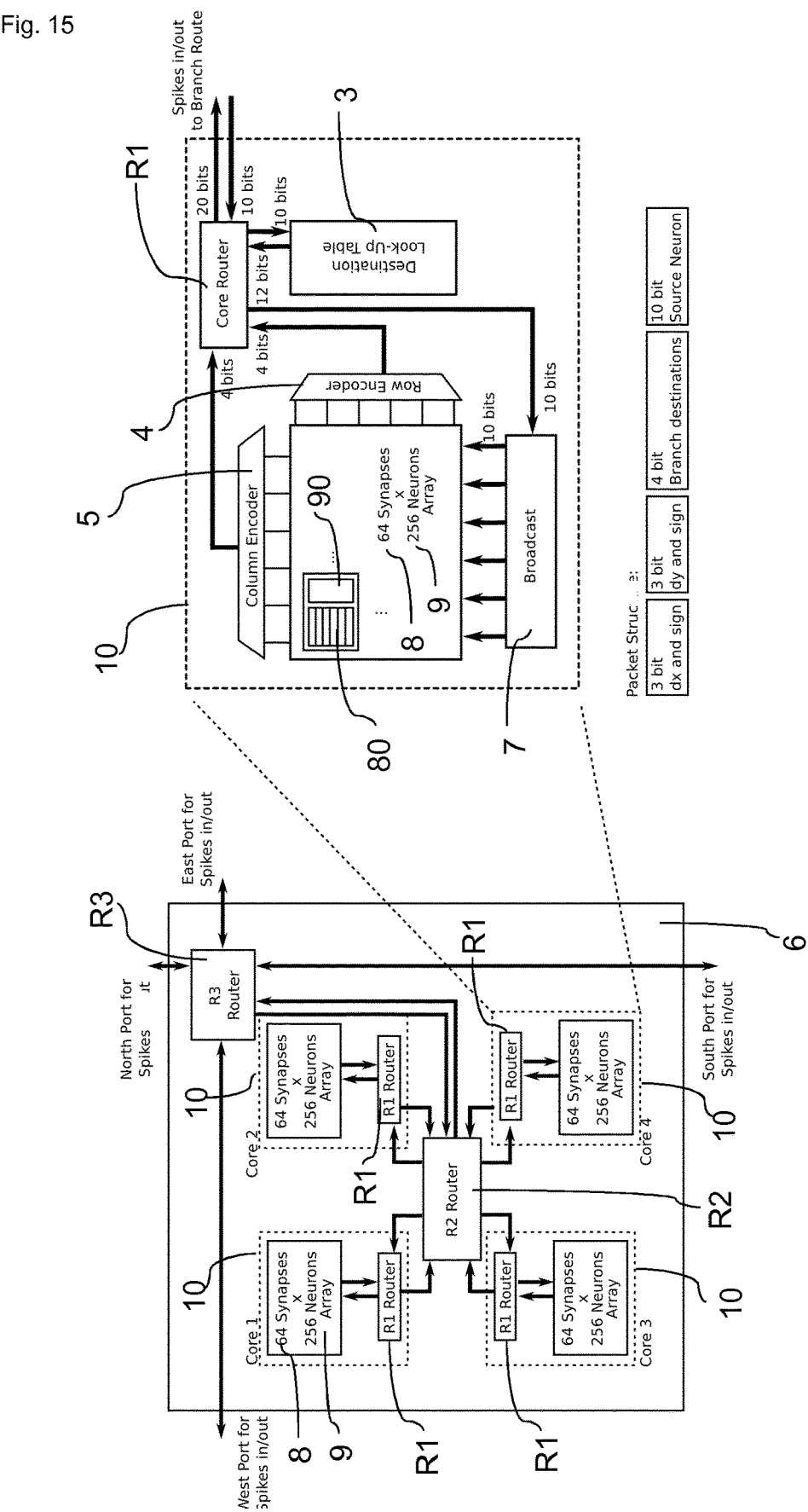
FIG. 15 shows the communication flow between cores and routers and details of the packet structure, in accordance to an embodiment of the invention.

FIG. 15 shows details of the structure of one core 10 in the network. In this example, one multi-core chip 6 has 4 cores 10 with 256 neurons 90 in each core 10 and 64 synapses 80 for each neuron 90. Each core 10 includes: synapse/neuron array 8, 9, column/row encoder 5, 4, broadcast driver 7, destination LUT 3 and local core (or first) router R1. Events generated by the neuron array 9 will be encoded and represented as 8 bits addresses (4 bits for column and 4 bits for row address). Events generated by the neuron array 9 will be assigned a 10 bits destination address (3 bits for dx distance and x-direction sign, 3 bits for dy and y-direction sign, 4 bits for target core 10 on the destination chip 6, i.e., which cores 10 to target once dx-dy chip has been reached) and 2 bits for additional source core ID that increases source address discrimination. Each event can be replicated several times and each replica can be assigned different destination addresses by the core router R1. In an embodiment of the invention, 2 bits are internally appended to the source address by the core address and used for reading the LUT (3) four times. In this way, different 12 bits destination addresses and core IDs are appended to each replica. The source 8 bits event address with the 12 bits data read from LUT 3 are sent as a single packet of 20 bits event before delivering to the (second) router R2. An event reaching a router R2 from (third) router R3 is broadcasted to the destination cores as described in FIG. 9.

Figure 16:
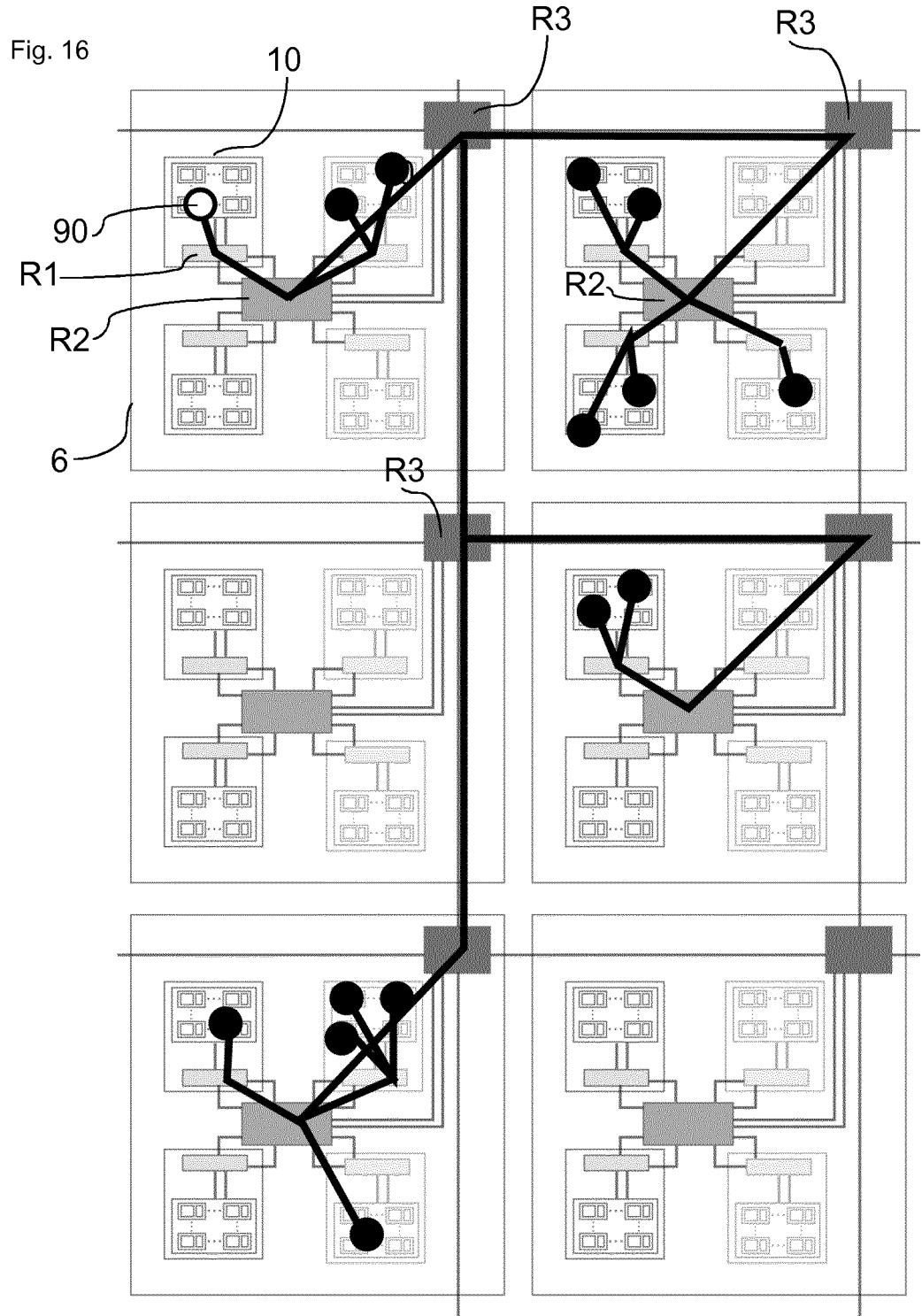
FIG. 16 shows an example of routing of an event from the source neuron to destination neurons, in accordance to an embodiment of the invention.

FIG. 16 shows an example of routing of an event from source computation node to destination nodes. By following the hierarchical multi-level scheme as described in FIG. 13, an event generated by a node 90 in any one chip 6 is assigned a specific destination. The event is also replicated multiple times and each replica is assigned a different destination. In the example, the event generated by the node 90 indicated with an open circle is assigned four different destinations and sent to four multi-chips 6. One of the replica events is delivered to another core 10 on the same chip 6 (its route is thus R1-R2-R1). The three other event are delivered to different chips 6 and the distributed locally on multiple cores 10 (thus their routes are R1-R2-R3- . . . -R3-R2-R1).

Figure 17:
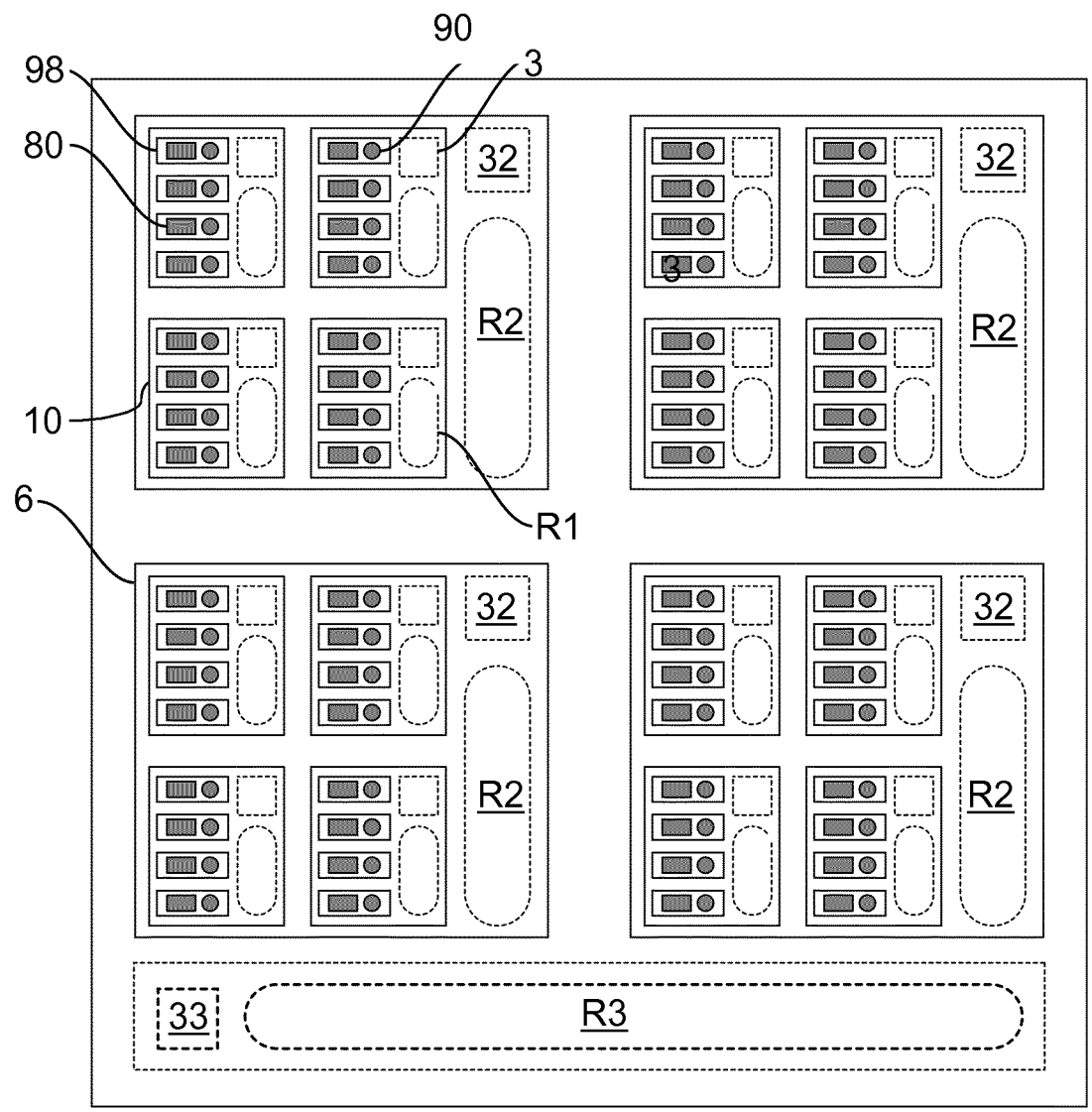
FIG. 17 shows a drawing illustrating a plurality of computing nodes arranged in modules.

FIG. 17 shows another example of a hierarchical routing fabric or network with heterogeneous memory structures. In this example, a self-similar computing architecture consists of a plurality of event-based computing nodes 90 accessing a local memory 80 to implement the required computation and interconnected by a hierarchy of routing systems (R1, R2, R3) of heterogeneous nature. The nodes 98 are arranged in cores 10 consisting of said plurality of nodes 90, a local (or first) router R1 and a router memory 3 accessed by said router R1. Groups of cores 10 are arranged in tiles (or chips or units) 6 consisting of said group of cores 10, a local (or second) router R2 and a router memory 32 accessed by said router R2. Said tile modules 6 are arbitrarily combined to form a self-similar structure wherein routers R2, R3 use source addresses as pointers to local memory entries 3, 32, 33 used for appending route data on the packet to be further transmitted. Additionally, said routers R2, R3 are programmed to process events delivered from higher levels and to route them to target lower-level destinations according to the route data contained in the packet.

The invention claimed is:

1. A neural network circuit, which comprises a plurality of tiles/chips (6); the tiles/chips (6) comprising a plurality of cores (10), the core (10) comprising at least one neuron circuit (90) that simulates biological neuron and at least one synapse circuit (80) that simulates synapse;

the neuron circuit (90) integrates multiple events received and accepted by the corresponding synapse circuits (80), and generates a spike event when the integrated signal crosses the trigger threshold;

its characteristics are:

the core (10) also includes: a core router R1 for providing circuit connectivity within the core;

the tile/chip (6) further includes: a chip router R2 for providing connectivity between the cores and a mesh router R3 for providing connectivity between the tiles/chips (6);

wherein, the core router R1 transmits or/and receives events to the chip router R2, and the chip router R2 transmits or/and receives events to the mesh router R3;

on one tile/chip (6), the core router R1, the chip router R2 and the mesh router R3 form a tree structure;

the mesh router R3 is arranged in a two-dimensional mesh; each tile/chip (6) has one mesh router R3, and the mesh router R3 interconnects the tree structure in the two-dimensional mesh;

a broadcast driver (7), which is configured to broadcast to synapse array (8) through the broadcast driver (7) after the core router R1 receives an event, and the synapse array (8) has a plurality of said synapse circuits (80).

2. The neural network circuit according to claim 1, wherein:

when the neuron circuit (90) generates a spike event, the address of the spike event is sent to the core router R1;

the core (10) further includes a destination LUT (3), which is configured to store the destination of the spike event and is accessible by the core router R1.

3. The neural network circuit according to claim 2, wherein:

the core router R1 determines whether send the event back to said core (10) or append to the event packet a digital code representing the destination for this event.

4. The neural network circuit according to claim 3, wherein:
the digital code representing the destination for this event includes 6-bits for chip/tile shifting of dx and dy, 2-bits for virtual source core ID and 4-bits for within-chip destinations.

5. The neural network circuit according to claim 4, wherein:
the digital code includes codes dx and dy for shifting;
after the mesh router R3 receives an event from the chip router R2, the mesh router R3 checks the shift number dx in the x direction firstly, and the shift direction is determined according to the sign of dx, dx is reduced by 1, and the event is transmitted to the correct direction;
if the shift number dx in the x direction is 0, the mesh router R3 checks the shift number dy in the y direction, and according to the sign of dy determines the shift direction, dy is reduced by 1, and the event is transmitted to the correct direction;
thus, the event travels along the mesh until both dx and dy are 0.

6. The neural network circuit according to claim 1, wherein:
the chip router R2 has three levels/layers branches or only one level/layer branches.

7. The neural network circuit according to claim 1, wherein:
CAM word is used as synapse circuit (80) for storing the address of the source neuron circuit (90) it is connected to, the synapse type, and its synaptic efficacy.

8. The neural network circuit according to claim 7, wherein:
the event arriving at one core are broadcasted to the whole core by the broadcast driver (7);
each CAM compares the event on the broadcast bus with stored address, the ones for which the address matches the broadcasted event will raise a match state and generate appropriate post-synaptic current.

9. The neural network circuit according to claim 1, wherein:
the core (10) includes: SRAM memory (2) for storing destination LUT (3).

10. The neural network circuit according to claim 1, wherein:
the neural network circuit further includes router memory (32) accessing for the chip router R2.

11. The neural network circuit according to claim 10, wherein:
router memories are programmed such that events climb the tree through chip router R2 at different levels as much as needed to reach any destination cores (10) within the chip (6).

12. The neural network circuit according to claim 11, wherein:
if the target of an event resides on a core (10) of a different chip (6), the event is sent through all the layers up to the mesh router R3, which will further process and deliver it along the appropriate directions in the mesh.

13. The neural network circuit according to claim 1, wherein:
a plurality of chip routers R2 constitute a tree-like router, and the tree-like router has multiple levels, and each level includes at least one dedicated chip router R2, which is used for core (10) communication within the level and is used for communication in the tree structure in sending events to/receiving events from other levels.

14. A router fabric equipment, which applied to network interconnection within and between tiles/chips (6) with multiple cores (10);
the core (10) includes at least one neuron circuit (90) that simulates biological neuron and at least one synapse circuit (80) that simulates synapse;
its characteristics are:
the core (10) also includes: a core router R1 for providing circuit connectivity within the core;
the tile/chip (6) further includes: a chip router R2 for providing connectivity between the cores and a mesh router R3 for providing connectivity between the tiles/chips (6);
wherein, the core router R1 transmits or/and receives events to the chip router R2, and the chip router R2 transmits or/and receives events to the mesh router R3;
on one tile/chip (6), the core router R1, the chip router R2 and the mesh router R3 form a tree structure;
the mesh router R3 is arranged in a two-dimensional mesh; each tile/chip (6) has one mesh router R3, and the mesh router R3 interconnects the tree structure in the two-dimensional mesh;
a broadcast driver (7), which is configured to broadcast to synapse array (8) through the broadcast driver (7) after the core router R1 receives an event, and the synapse array (8) has a plurality of said synapse circuits (80).

15. The router fabric equipment according to claim 14, wherein:
CAM word is used as synapse circuit (80) for storing the address of the source neuron circuit (90) it is connected to, the synapse type, and its synaptic efficacy.

16. The router fabric equipment according to claim 15, wherein:
the event arriving at one core are broadcasted to the whole core by the broadcast driver (7);
each CAM compares the event on the broadcast bus with stored address, the ones for which the address matches the broadcasted event will raise a match state and generate appropriate post-synaptic current.

17. The router fabric equipment according to claim 14, wherein:
router memories are programmed such that events climb the tree through chip router R2 at different levels as much as needed to reach any destination cores (10) within the chip (6).

18. The router fabric equipment according to claim 17, wherein:
if the target of an event resides on a core (10) of a different chip (6), the event is sent through all the layers up to the mesh router R3, which will further process and deliver it along the appropriate directions in the mesh.

19. The router fabric equipment according to claim 14, wherein:
a plurality of chip routers R2 constitute a tree-like router, and the tree-like router has multiple levels, and each level includes at least one dedicated chip router R2, which is used for core (10) communication within the level and is used for communication in the tree structure in sending events to/receiving events from other levels.

20. The router fabric equipment according to claim 14, wherein:

when the neuron circuit (90) generates a spike event, the address of the spike event is sent to the core router R1;

the core (10) further includes a destination LUT (3), which is configured to store the destination of the spike event and is accessible by the core router R1;

the core router R1 determines whether send the event back to said core (10) or append to the event packet a digital code representing the destination for this event;

the digital code includes codes dx and dy for shifting;

after the mesh router R3 receives an event from the chip router R2, the mesh router R3 checks the shift number dx in the x direction firstly, and the shift direction is determined according to the sign of dx, dx is reduced by 1, and the event is transmitted to the correct direction;

if the shift number dx in the x direction is 0, the mesh router R3 checks the shift number dy in the y direction, and according to the sign of dy determines the shift direction, dy is reduced by 1, and the event is transmitted to the correct direction;

thus, the event travels along the mesh until both dx and dy are 0.

\* \* \* \* \*